(12) United States Patent
Adams, IV

(10) Patent No.: US 6,869,053 B2
(45) Date of Patent: Mar. 22, 2005

(54) SUCTION HOLDER FOR RAZOR

(75) Inventor: William E. Adams, IV, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 462 days.

(21) Appl. No.: 09/851,639

(22) Filed: May 9, 2001

(65) Prior Publication Data

US 2001/0040202 A1 Nov. 15, 2001

Related U.S. Application Data

(60) Provisional application No. 60/203,856, filed on May 12, 2000.

(51) Int. Cl.[7] .......................... F16B 47/00; A45D 42/14
(52) U.S. Cl. ..................................... 248/206.2; 248/363
(58) Field of Search .......................... 248/205.5, 205.6, 248/206.2, 309.3, 363, 467; 403/78, 79, 83, 84, 103, 104, 106, 107; 40/597, 617; 464/37; 211/99, 100

(56) References Cited

U.S. PATENT DOCUMENTS

| | | | | |
|---|---|---|---|---|
| 435,696 A | * | 9/1890 | Hoffmann | 211/45 |
| 914,775 A | * | 3/1909 | Aarons | 116/DIG. 24 |
| 1,859,893 A | | 5/1932 | Ritz-Woller | 248/542 |
| 2,502,714 A | | 4/1950 | Garnett | 248/537 |
| 2,638,296 A | * | 5/1953 | Battle | 248/105 |
| D174,366 S | * | 3/1955 | Ziskind | D8/368 |
| 3,237,330 A | * | 3/1966 | Dinstbir | 40/593 |
| 4,506,408 A | * | 3/1985 | Brown | 16/225 |
| 4,566,570 A | * | 1/1986 | Geisthoff | 192/56.1 |
| 4,699,279 A | * | 10/1987 | Spira | 211/89 |
| 4,881,485 A | * | 11/1989 | Feinberg | 116/28 R |
| 5,078,356 A | * | 1/1992 | Adams | 248/206.2 |
| 5,313,734 A | * | 5/1994 | Roberts | 248/538 |
| 5,320,061 A | * | 6/1994 | Laughlin et al. | 116/173 |
| 5,323,996 A | * | 6/1994 | Rendall | 248/315 |
| 5,582,488 A | * | 12/1996 | Dudley et al. | 403/103 |
| 5,673,884 A | * | 10/1997 | Yemini | 248/205.5 |
| D388,271 S | * | 12/1997 | Moore | D6/546 |
| 5,762,305 A | * | 6/1998 | Lee | 248/205.8 |
| D408,725 S | | 4/1999 | Adams | D8/373 |
| 5,961,087 A | * | 10/1999 | Lee | 248/362 |
| 6,131,865 A | * | 10/2000 | Adams | 248/206.2 |

OTHER PUBLICATIONS

Japanese Catalogue, received Dec. 13, 1990.

* cited by examiner

Primary Examiner—Anita King
Assistant Examiner—John Szumny
(74) Attorney, Agent, or Firm—Buchanan Ingersoll PC

(57) ABSTRACT

A holder for a razor or similarly shaped article has a suction cup and a split ring or a stem held within at least one bore through the neck of the suction cup. The bore and the ends of the split ring or stem have a multi-sided, preferable a square, cross section. Each side aligns with and is opposite a side of the bore keeping the split ring or stem in a selected position relative to the suction cup. When a square bore is used, the ring can be rotated 90 degrees within the bore from a plane parallel to a wall on which the suction cup could be mounted to a plane perpendicular to that wall. When a razor is placed within the ring when the ring is perpendicular to the wall, the ring will not be deflected downward.

11 Claims, 6 Drawing Sheets

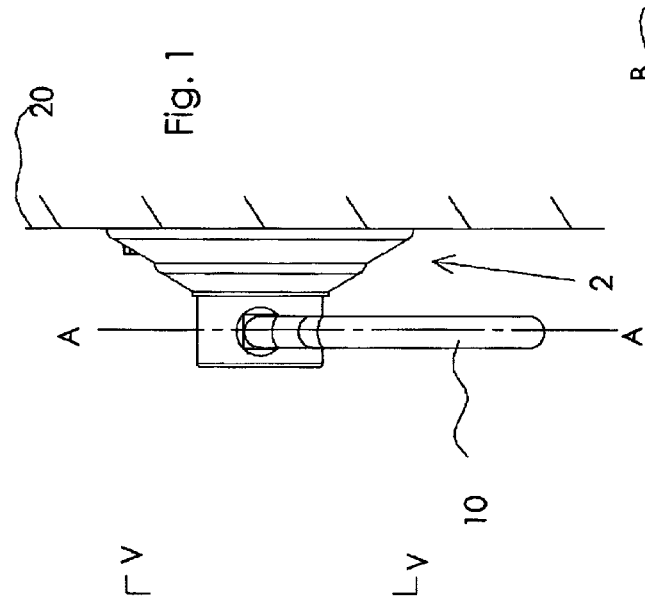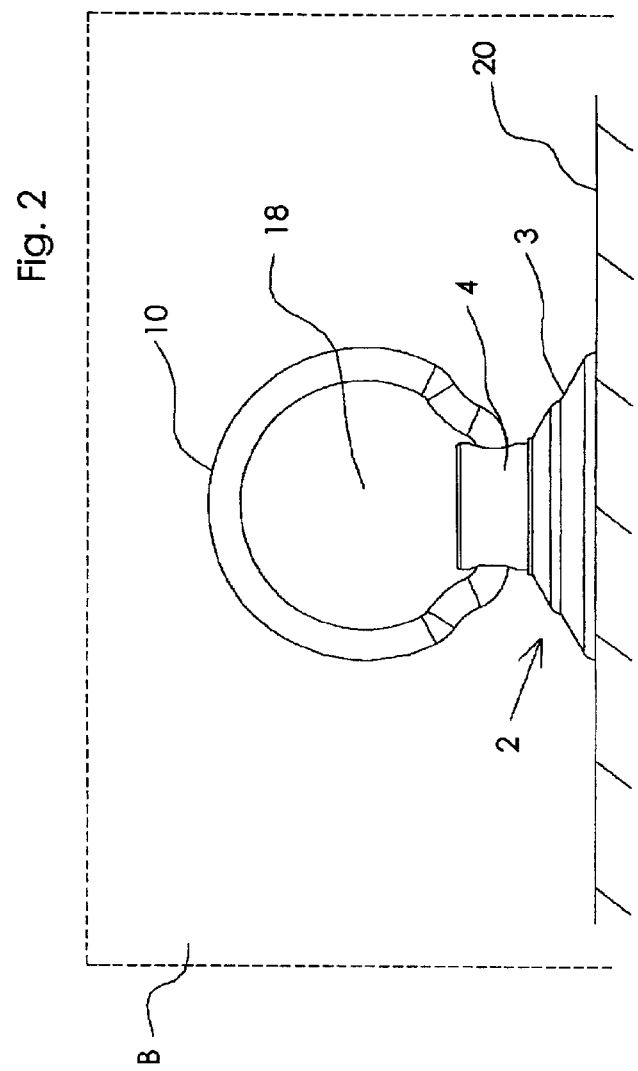

SUCTION HOLDER FOR RAZOR

CROSS REFERENCE TO RELATED APPLICATION

Applicant claims priority to provisional application Ser. No. 60/203,856, filed May 12, 2000.

FIELD OF INVENTION

The invention relates to holders for injector or double edge blade razors the holder being of the type having a suction cup which attaches to a wall.

BACKGROUND OF THE INVENTION

A wide variety of devices for holding objects on a wall or other flat surface have been available. Many of these holders have one or more suction cups to which a basket, tray, ring, hook or similar structure is attached. For example U.S. Pat. No. 5,078,356 discloses a suction cup having an offset-mounted hook. In this device the suction cup has a cup-shaped base and cylindrical neck with a transverse circular bore. A hook has a straight cylindrical top which passes through the bore. A flat head on the top portion retains the hook in the neck of the suction cup. Because the bore and the top portion of the hook are cylindrical the hook is free to rotate within the bore. Another suction cup holder is disclosed in U.S. Pat. No. Des. 408,725. The suction cup in that holder has a cup-shaped base and a loop attached to the base. A hook is fitted through the loop. Yet another type of suction cup holder is disclosed in U.S. Pat. No. 1,859,893. The suction cup in that holder has a cylindrical bore through which a cylindrical rod passes. The ends of a U-shaped bail are attached to the ends of the rod. This type of configuration has also been used for towel holders in which a ring having a circular cross section passes through a cylindrical bore in the neck of the suction cup. In all of these holders the supporting ring or hook is made of metal or a plastic which is harder than the neck of the suction cup which typically is vinyl. In the holder which has a ring passing through the suction cup the ring can be positioned so that the ring lies in a plane that is perpendicular to the wall on which the suction cup is mounted. If a towel is hung on the ring the ring will not remain in that plane but will be deflected downward.

Injector razors have a long handle and a generally rectangular head mounted at on end of the handle such that the head is transverse to the handle. Consequently, that razor can easily be held in a holder of the type having a ring passing through a cylindrical bore in the neck of the suction cup. However, when I made such a holder I discovered that the ring did not remain in a plane perpendicular to the wall on which the holder was mounted. Instead, the weight of the razor deflected the ring downward until the lower end of the razor rested against the wall. This made it difficult to remove the razor from the holder.

Another type of suction cup holder has a U-shaped holding portion that is permanently attached to one or more suction cups in a manner that it will not move from a plane perpendicular to the wall on which the holder was mounted. Such a holder is disclosed in U.S. Pat. No. 2,502,714. This type of suction cup requires a larger package than the suction cup with a ring that can be moved from a position in a plane perpendicular to the wall on which the holder was mounted to a plane parallel to that wall.

There is a need for a razor holder of the type having a suction cup with a ring wherein the ring can be positioned in a plane parallel to a wall on which the suction cup will be mounted for shipment and then the ring can be moved to and remain in a plane perpendicular to that wall while holding a razor.

SUMMARY OF THE INVENTION

I provide a holder for a razor that has a suction cup of the type having a cup-shaped base and a generally cylindrical neck. A bore having a multi-sided, preferably square, cross section passes transversely through the neck. A split ring has spaced apart ends having a same cross section. These ends fit within either end of the bore in the neck of the suction cup. The suction cup is an otherwise conventional suction cup made of a soft vinyl. The ring is made of a harder plastic such as polypropylene or polycarbonate. When a square bore is used the ring can be rotated 90 degrees within the bore from a plane parallel to a wall on which the suction cup could be mounted to a plane perpendicular to that wall. When a razor is placed within the ring, the ring will not be deflected downward. The holder may also be used for a toothbrush and similarly shaped objects as well as for signs or tags.

Other objects and advantages of the holder will become apparent from a description of a present preferred embodiment shown in the drawings.

BRIEF DESCRIPTION OF THE DRAWINGS

FIG. 1 is a side view of a present preferred embodiment of my holder with the ring is a plane parallel to a wall on which the suction cup is mounted.

FIG. 2 is a top view of the holder shown in FIG. 1 with the ring in a plane parallel to the wall on which the suction cup is mounted.

DESCRIPTION OF THE PREFERRED EMBODIMENTS

Figure 6:
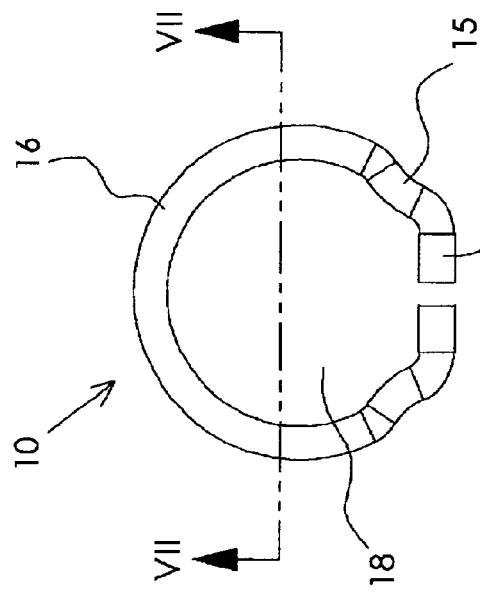
FIG. 6 is a top view of the ring used in the embodiment of FIG. 1.
Figure 7:
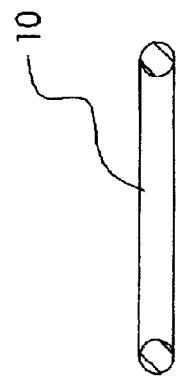
FIG. 7 is a sectional view taken along the line VII—VII in FIG. 6.

As shown in FIGS. 1 through 4, the first embodiment of my holder 1 has a suction cup 2 having a cup portion or base 3 and a cylindrical neck 4. A split ring 10 has two spaced apart end portions 14 having a square cross section. I prefer to provide a transition portion 15 between each square end 14 and the circular portion 16. The transition portion 15 which can be seen most clearly in FIG. 6 provides a larger open area 18 within the ring 10 than would be present if no transition were provided.

Figure 4:
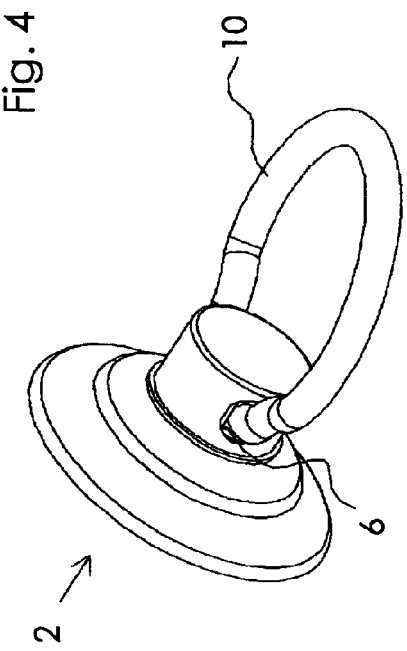
FIGS. 3 and 4 are perspective views of the holder shown in FIG. 2.
Figure 3:
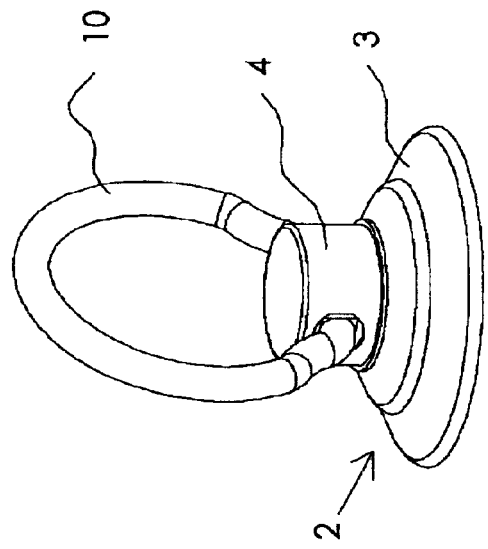

A bore 6 having a square cross section passes transversely through the neck 4. The square ends 12 of the split ring 10 fit within either end of the square bore in the neck 4 of the suction cup 2. The suction cup 2 is an otherwise conventional suction cup made of a soft vinyl. The neck of the suction cup may have a circular cross-section as shown or may be square, hexagonal, oval or other shape that creates a generally cylindrical structure The ring 10 is made of a harder plastic such as polypropylene or polycarbonate. Consequently, the ring 10 can be rotated 90 degrees within the square bore from a plane indicated by dotted line A—A in FIG. 1 that is parallel to a wall 20 on which the suction cup 10 is mounted to a plane B shown in dotted lines in FIG. 2 that is perpendicular to that wall. When the ring is in either of these two positions every side of both ends of the ring is opposite a side of the, bare. When a razor, toothbrush or similarly shaped object (not shown) is placed within the ring 10 oriented as shown in FIGS. 3 and 4, the weight of the object will tend to push the ring downward. However, because of the square shape of the bore and the ends of the ring, the ring will not be deflected downward. The square bore 6 in the embodiment shown in the drawings extends completely through the suction cup. However, one could provide two rectangular cavities to receive the square ends 14 of the ring 10 such that neither cavity extends completely through the neck. The two cavities would be on a common axis and separated by a web in the center of the neck.

Figure 5:
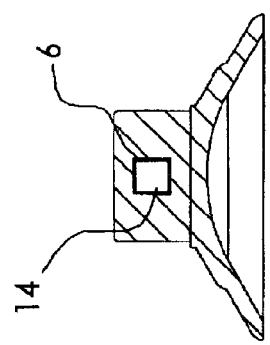
FIG. 5 is a sectional view taken along the line V—V in FIG. 1.
Figure 9:
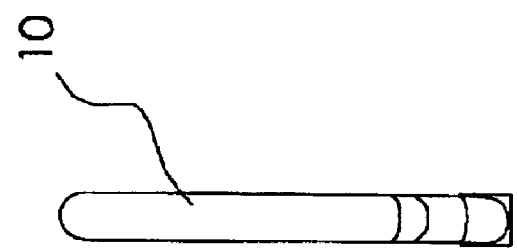
FIG. 9 is a side view of the ring shown in FIGS. 6, 7 and 8.
Figure 8:
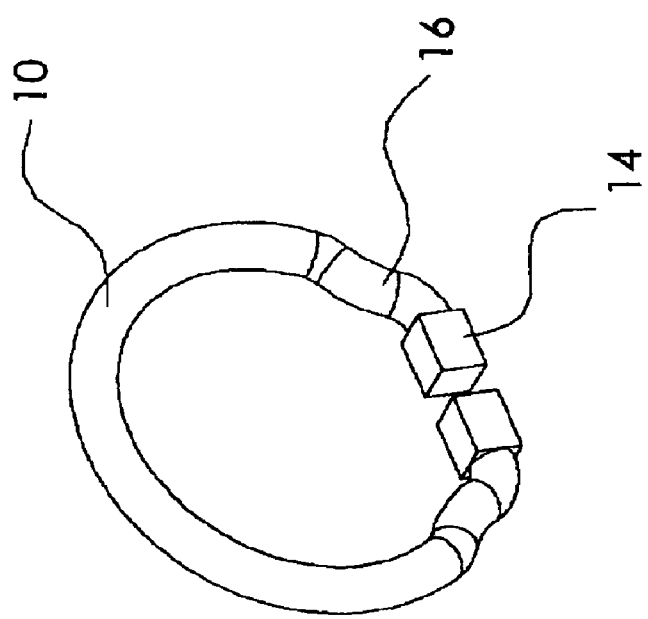
FIG. 8 is a perspective view of the ring shown in FIG. 6.

Although I prefer that the bore and the ends of the split ring have a square cross section, other multi-sided cross-sections could be used. A hexagon and octagon would permit the split ring to be positioned as shown in FIGS. 1, 2, 3 and 4. A pentagon may also be acceptable. Whatever shape is chosen the split ring would be held in positions in which each side of each end of the split ring is opposite a side of the bore as can be seen in FIG. 5. If a shape having more than four sides is selected it likely would be necessary to use a harder material for the neck of the suction cup than is needed for a four sided or three sided bore so that the spilt ring does not slip from the desired position when a razor is placed within the ring.

Figure 10:
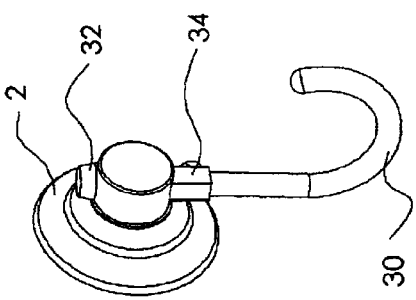
FIG. 10 is a top view of a second embodiment of my holder that utilizes a J-hook.
Figure 11:
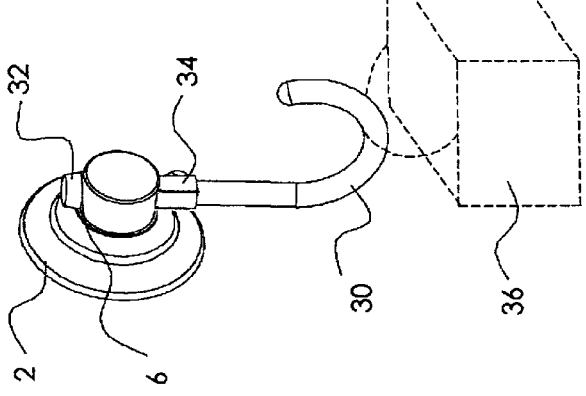
FIG. 11 is a perspective view of the embodiment of FIG. 10 showing the J-hook after rotation.

While I prefer to provide a holder having a split ring as shown in FIGS. 1 through 9, other types of rings or hooks could be used. In a second present preferred embodiment shown in FIGS. 10 and 11, I use the same suction cup 2 but provide a J-hook 30. The J-hook passes through the square bore 6 and is retained in the bore by a head 32 on the J-hook. A portion 34 of the J-hook 30 adjacent the head 32 has a square cross section. For shipment the J-hook is positioned as shown in FIG. 10. For use the J-hook is turned to the position shown in FIG. 11. A cube shaped article 36 shown in chain-line is illustrated as being hung on the J-hook. Any force acting on an end of the article 36 may cause the article to swing. That force could be translated to the hook. If the hook had a completely round cross section the hook would rotate toward the position of the hook shown in FIG. 10. However, the square section 34 of the hook within square bore 6 prevents rotation.

Figure 12:
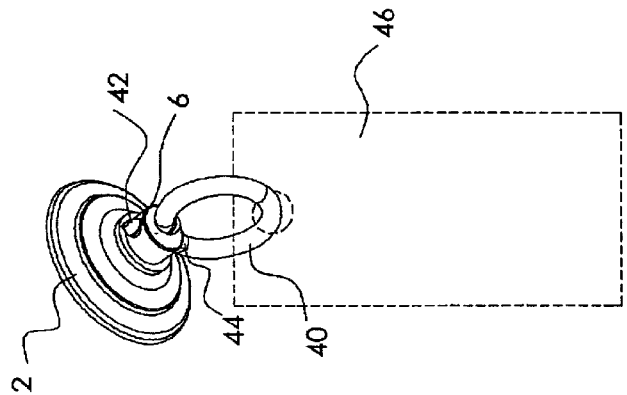
FIG. 12 is a perspective view of a third embodiment of my holder that utilizes an eye-type hook.

In the embodiment of FIG. 12 an eye-hook 40 having a head 42 and portion with a multiple sided cross-section 44 is provided. This cross-section 44 matches the cross-section of the bore 6. An identification tag 46 shown chain-line can be hung from the hook. This embodiment is particularly useful for carrying a parking pass on the inside of a vehicle window. The holder could be positioned as in FIG. 12 or rotated so that the eye-hook 40 is at the 3 o'clock or 9 o'clock position.

Figure 13:
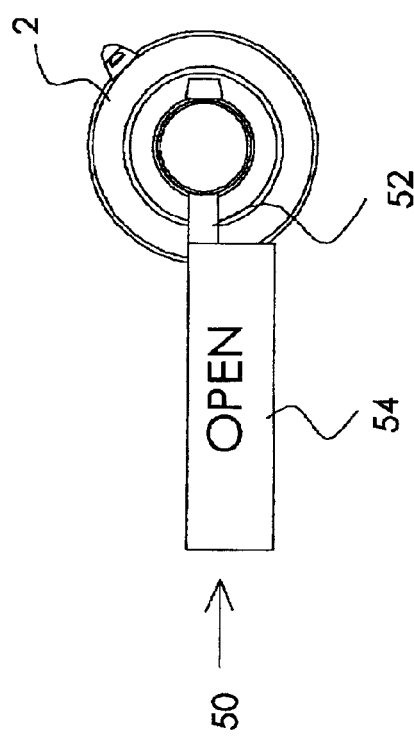
FIGS. 13 and 14 are top views of a fourth embodiment of my holder containing a flag or sign positioned differently in each of the figures.
Figure 14:
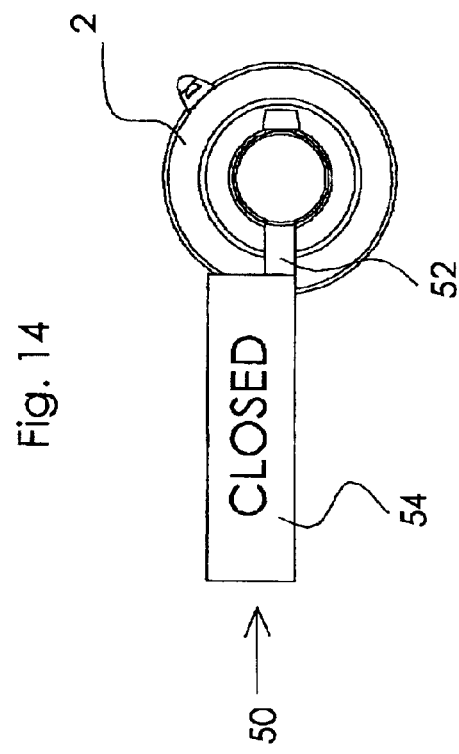

Yet another embodiment shown in FIGS. 13 and 14 contains a flag 50 having a display portion 54 that may contain words or symbols and a stem or pole 52 with a square cross-section. This embodiment can be placed upon the door of a retail business. That flag 50 can be positioned with the display 54 oriented as shown in either FIG. 13 or 14 to indicate whether the store is open or closed. Opening and closing of the door on which this embodiment is mounted could cause the flag 50 to vibrate or flex. Because the flag pole has a cross section that mates with the cross section of the bore through the suction cup 2, such vibration will not cause the flag to rotate from the desired position.

Although I have shown certain present preferred embodiments of my holder it should be distinctly understood that the invention is not limited thereto, but may be variously embodied within the scope of the following claims.

I claim:

1. A holder comprising:
   (a) a suction cup having a cup portion, a neck containing at least one bore having a multi-sided cross section, and
   (b) a split ring having two ends, said ends having a multi-sided cross-section complementary to the bore, each end sized and fitted within the at least one bore so that the split ring can be rotated within the bore from a first position to a second position such that in each position every side of the end of the split ring is opposite a side of the at least one bore.

2. The holder of claim 1, wherein the multi-sided cross-section of the at least one bore and the multi-sided cross-section of the ends of the split ring are square.

3. The holder of claim 1, wherein the multi-sided cross-section of the at least one bore and the multi-sided cross-section of the ends of the split ring are hexagonal.

4. The holder of claim 1, wherein the multi-sided cross-section of the at least one bore and the multi-sided cross-section of the ends of the split ring are octagonal.

5. The holder of claim 1, wherein the suction cup is made of soft vinyl, and the split ring is made of one of polypropylene and polycarbonate.

6. The holder of claim 1 wherein the at least one bore is a single bore passing through the neck.

7. The holder of claim 1 wherein the at least one bore is a pair of bores on a common axis each bore extending from an outer surface of the neck toward a center of the next so that a web separates the two bores.

8. A holder comprising:
   a. a suction cup having a cup portion and a neck extending from the cup portion, the neck containing a transverse bore having a multi-sided cross section, and
   b. a hook having two ends, a portion of said hook adjacent one of said ends having a multi-sided cross-section complementary to the bore, said portion fitted within the bore so that the hook can be rotated within the bore from a first position to a second position such that in each position every side of the portion of the hook is opposite a side of the bore.

9. The holder of claim 8 wherein the hook is one of an eye hook and a J-hook.

10. The holder of claim 8 also comprising a head attached to the end of the hook adjacent the portion having a multi-sided cross section.

11. A holder and flag device comprising:
   a. a suction cup having a cup portion and a neck extending from the cup portion, the neck containing a transverse bore having a multi-sided cross section, and
   b. a flag having a display portion attached to a pole, at least a portion of said pole having a multi-sided cross-section complementary to the bore, said portion fitted within the bore so that the flag can be rotated within the bore from a first position to a second position such that in each position every side of the portion of the pole is opposite a side of the bore.

* * * * *